United States Patent
Huang et al.

(10) Patent No.: US 11,347,073 B2
(45) Date of Patent: May 31, 2022

(54) STRUCTURED LIGHT EMITTING MODULE, 3D STRUCTURED LIGHT SENSOR, AND ELECTRONIC DEVICE USING THE SAME

(71) Applicant: TRIPLE WIN TECHNOLOGY(SHENZHEN) CO.LTD., Shenzhen (CN)

(72) Inventors: Chun-Yao Huang, New Taipei (TW); Cheng-An Lin, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 316 days.

(21) Appl. No.: 16/455,918

(22) Filed: Jun. 28, 2019

(65) Prior Publication Data

US 2020/0278561 A1 Sep. 3, 2020

(30) Foreign Application Priority Data

Feb. 28, 2019 (CN) .......................... 201910153385.8

(51) Int. Cl.
*G02B 27/48* (2006.01)
*G02B 27/42* (2006.01)
*G02B 7/02* (2021.01)
*G02B 26/08* (2006.01)

(52) U.S. Cl.
CPC .............. *G02B 27/48* (2013.01); *G02B 7/023* (2013.01); *G02B 26/0875* (2013.01); *G02B 27/4233* (2013.01)

(58) Field of Classification Search
CPC .. G02B 27/646; G02B 27/48; G02B 27/4233; G02B 26/0875; G06T 7/521; G01B 11/2513; G01B 11/25; G01B 11/254; H05K 1/0274
See application file for complete search history.

(56) References Cited

U.S. PATENT DOCUMENTS

| | | | | |
|---|---|---|---|---|
| 2006/0227437 A1* | 10/2006 | Makii | ................. | G02B 27/646 359/824 |
| 2007/0280668 A1* | 12/2007 | Kubo | ...................... | G03B 3/10 396/133 |
| 2013/0100304 A1* | 4/2013 | Wade | .................. | G02B 27/646 348/208.4 |
| 2014/0355120 A1* | 12/2014 | Yeo | ........................ | G03B 5/00 359/557 |
| 2018/0084241 A1* | 3/2018 | Chen | ................... | H04N 13/218 |
| 2019/0033604 A1 | 1/2019 | Chen et al. | | |

(Continued)

FOREIGN PATENT DOCUMENTS

CN 107589623 A * 1/2018
GN 208239772 U 12/2018
TW 201903451 A 1/2019

*Primary Examiner* — Ephrem Z Mebrahtu
(74) *Attorney, Agent, or Firm* — ScienBiziP, P.C.

(57) ABSTRACT

A structured light emitting module which gives an adjustable and resettable patterned structure to the laser light emitted comprises a laser source, a structured light lens, an optical diffraction element, and a driver. The optical diffraction element is located above the laser source, and the lens and the optical diffraction element cooperate to convert the laser into a speckled or other pattern. The lens is disposed in the driver, the driver can move the lens microscopically to change an illumination range or the structure of the patterned laser light which is output.

14 Claims, 4 Drawing Sheets

(56) References Cited

U.S. PATENT DOCUMENTS

2019/0113621 A1* 4/2019 Chen ...................... H04N 13/15
2019/0273906 A1* 9/2019 Xiao ...................... G02B 27/48
2020/0371418 A1* 11/2020 Zhang ................ G02B 19/0014

* cited by examiner

STRUCTURED LIGHT EMITTING MODULE, 3D STRUCTURED LIGHT SENSOR, AND ELECTRONIC DEVICE USING THE SAME

FIELD

The subject matter herein generally relates to light projection.

BACKGROUND

Structured light emitter modules are widely used in computer, communication, and consumer electronic products, for facial recognition and other purposes.

However, when the structured light emitter module is tilted or shaken, an erroneously structured light pattern may occur which may result in a false identification.

BRIEF DESCRIPTION OF THE DRAWINGS

Implementations of the present disclosure will now be described, by way of embodiments, with reference to the attached figures.

DETAILED DESCRIPTION

Figure 1:
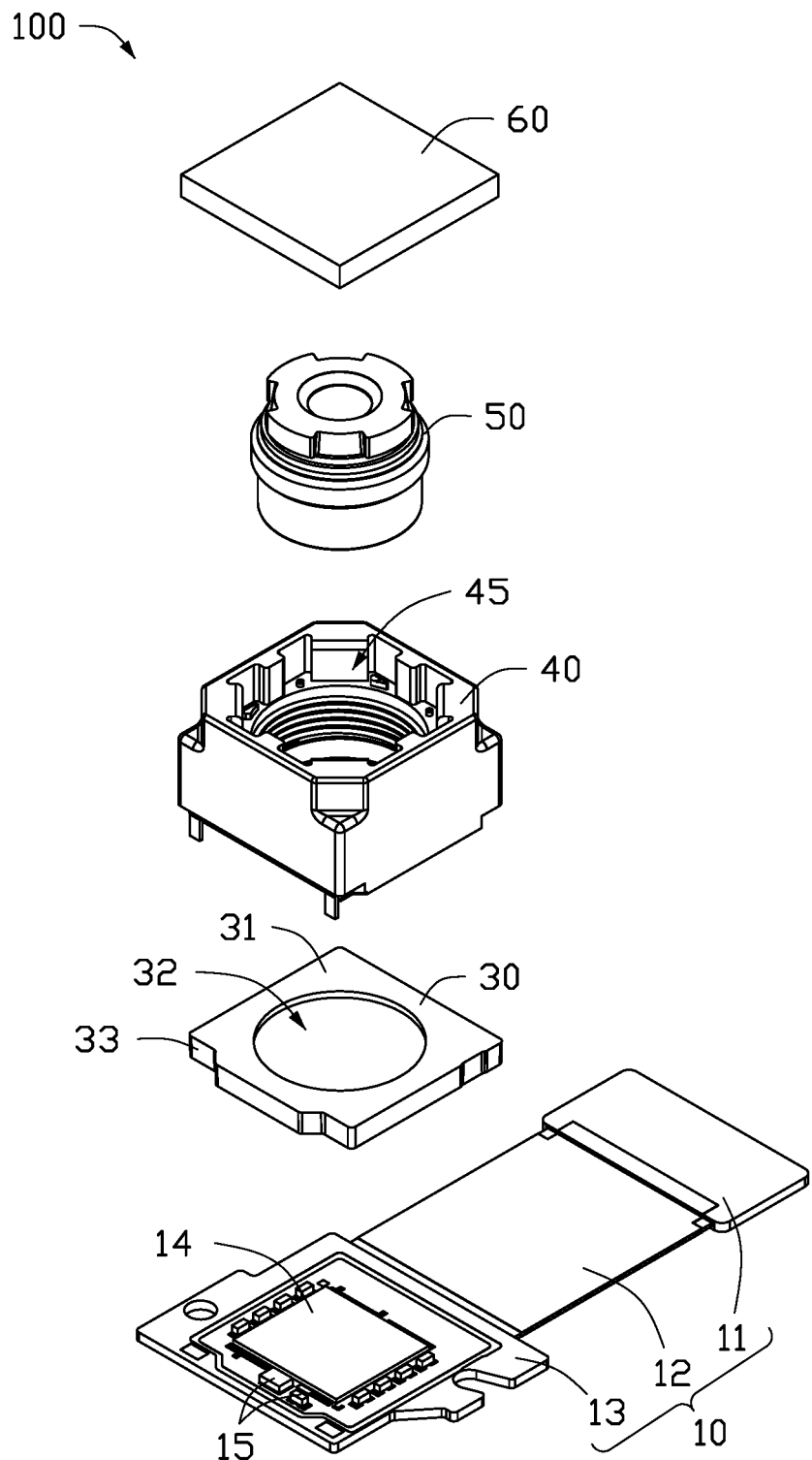
FIG. 1 is an exploded perspective view of a structured light emitter module of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
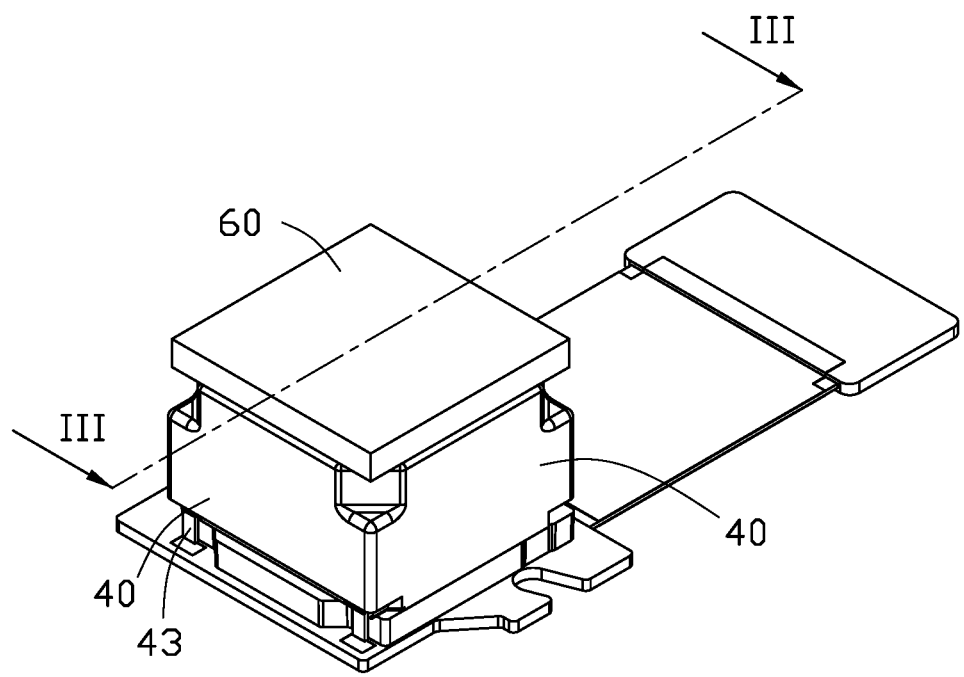
FIG. 2 is a view of the structured light emitter module in FIG. 1 when assembled.
Figure 3:
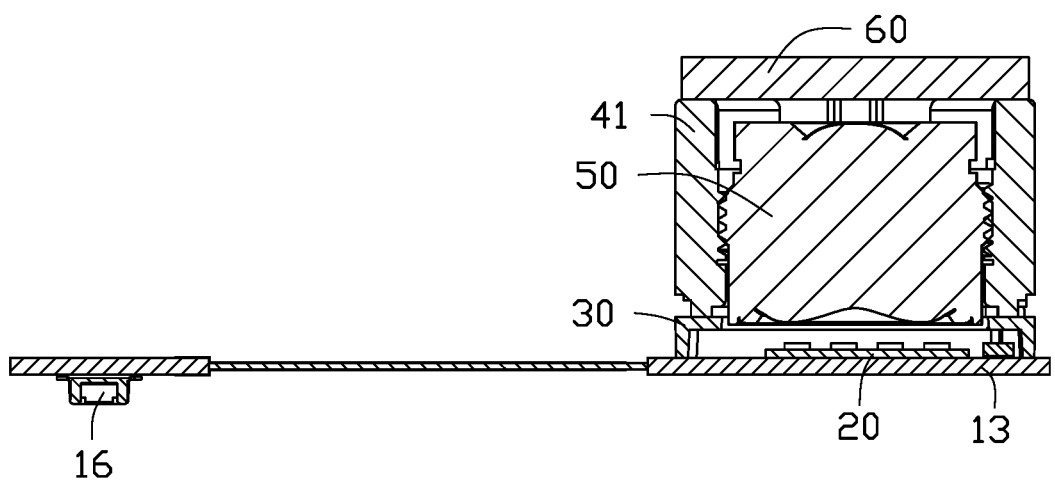
FIG. 3 is a cross-sectional view along a line of FIG. 2.

FIGS. 1-3 show an embodiment of a structured light emitter module 100 including a flexible-rigid circuit board 10 (hereinafter "circuit board 10"), a laser source 20, a carrier 30, a driver 40, an optical lens 50, and an optical diffraction component 60.

The carrier 30 is disposed at one side of the circuit board 10. The laser source 20 is received in the carrier 30. The laser source 20 is disposed between the carrier 30 and the circuit board 10. The driver 40 is disposed at the side of the carrier 30 away from the circuit board 10. The driver 40 includes an accommodating portion 45. The accommodating portion 45 is located in the driver. The optical lens 50 is movably disposed in the accommodating portion 45. The optical lens 50 can move along a direction away from the circuit board 10. The optical diffraction element 60 is disposed at one side away from the circuit board 10. The optical diffraction element 60 cover the driver 40 and the optical lens 50.

The carrier 30 includes a carrier surface 31 and a plurality of sidewalls 33 extending perpendicularly around a periphery of the carrier surface 31. The height of the sidewalls 33 is greater than the thickness of the laser source 20. Thus, the laser source 20 is received and sunken within the carrier 30. The driver 40 is mounted on the carrier surface 31. The carrier surface 31 defines a through hole 32. The through hole 32 is aligned with the accommodating portion 45. The carrier 30 supports the driver 40. The carrier 30 increases space available for internal heat dissipation from the structured light emitter module 100.

In one embodiment, the laser source 20 is a vertical-cavity surface-emitting laser (VCSEL) source. In other embodiments, the laser source 20 may be selected from other laser emitting devices such as a ruby laser.

In one embodiment, the circuit board 10 includes a first rigid board 11, a second rigid board 13, and a flexible board 12. The flexible board 12 is coupled between the first hard board 11 and the second hard board 13. The second hard board 13 includes a central area 14 and a control chip 15. The central area 14 and the control chip 15 are disposed at a side of the second hard circuit board 13 adjacent to the driver 40. The central area 14 is located in a central area of the second rigid circuit board 13. The control chip 15 is disposed at a periphery of the central area 14 for processing electrical signals. The control chip 15 is electrically connected to the circuit board 10. The laser source 20 is disposed in the central area 14. The circuit board 10 further includes a motherboard connector 16. The circuit board 10 is electrically connected to an external circuit (not shown) through the motherboard connector 16. In other embodiments, the circuit board 10 can be flexible circuit board or rigid circuit board.

In one embodiment, the laser source 20 and the driver 40 are disposed on the circuit board 10. The laser source 20 is electrically connected to the circuit board 10. The driver 40 is electrically connected to the circuit board 10. The circuit board 10 transmits an electrical signal to the laser source 20 and the driver 40.

In operation, the circuit board 10 controls the laser source 20 to emit laser light. The laser light enters the optical lens 50. The optical lens 50 collimates and expands the laser light. The collimated laser light from the lens 50 enters the optical diffraction element 60. The optical diffraction element 60 scatters the laser light to obtain a desired speckle pattern. When the complete speckle pattern cannot be obtained, or needs to be reset, the driver 40 can be operated to adjust the position of the optical lens 50, to change the distance and range of the laser to obtain a complete speckle pattern.

The driver 40 can be micro-drive device that can move the optical lens 50 in microscopic steps, such as thermal driver, piezoelectric driver, or micro-electric motor driver. The driver 40 is electrically connected to the circuit board 10. The driver 40 is fixed above the carrier 30.

In one embodiment, the driver 40 is thermal driver, such as two-layer metal type thermal driver or shape memory alloy type driver. When the driver 40 is the two-layer metal type thermal driver, the housing 41 of the driver 40 includes at least two metal regions. Each metal region contains at least one metal component. The metal component of the metal region on the side close to the accommodating portion 45 is different from the metal component of the metal region on the side far from the accommodating portion 45. Different metal components have different coefficients of thermal expansion. Upon being heated, the driver 40 can be deformed in a predetermined direction. The driver 40 moves the optical lens 50 inside the accommodating portion 45. When the driver 40 is the shape memory alloy type driver, the driver 40 includes shape memory alloy composition. The shape memory alloy can memorize one or more predetermined shapes, and the shape memory alloy can be gradually restored to a predetermined shape by applying heat to the driver 40. The optical lens 50 inside the accommodating portion 45 can be moved by controlling the temperature (the heating) of the driver 40.

In another embodiment, the driver 40 is piezoelectric actuator, such as piezoelectric cantilever driver or laminated piezoelectric driver. When the driver 40 is piezoelectric cantilever driver, the housing 41 of the driver 40 includes at least two piezoelectric regions. Each of the piezoelectric regions includes at least one piezoelectric component. The piezoelectric component of the piezoelectric region on the side close to the accommodating portion 45 is different from the component of the piezoelectric region on the side away from the accommodating portion 45. The piezoelectric material of different piezoelectric regions can be deformed in different directions by applying different electric charges to the driver 40. The driver 40 can thereby move the optical lens 50 inside the accommodating portion 45. When the driver 40 is laminated piezoelectric driver, the laminated piezoelectric driver includes a plurality of (at least three) piezoelectric regions. The piezoelectric material of different piezoelectric regions can be deformed in different directions by applying different electrical charges to the driver 40.

In yet another embodiment, the driver 40 is micro electric motor driver, which may include a mounting bracket, an upper elastic panel, a lower elastic panel, a magnet, and a coil. The upper elastic panel and the lower elastic panel are disposed at opposite sides of the mounting bracket and can be elastically deformed. The optical lens 50 is connected to the upper elastic panel and the lower elastic panel. The upper elastic panel cooperates with the lower elastic panel to establish the position of the optical lens. The magnet is fixed in the side wall of the mounting bracket for generating a magnetic field, and the coil is disposed in the mounting bracket to move the optical lens 50 by electromagnetic interaction with the magnet.

The driver 40 can thus be driven by an electric charge or by heating or by energizing. The driver 40 moves the optical lens 50 and adjusts the laser irradiation range. The range of light emitted by the structured light emitting module 100 is increased, which effectively improves the recognition range of the structured light sensing.

Figure 4:
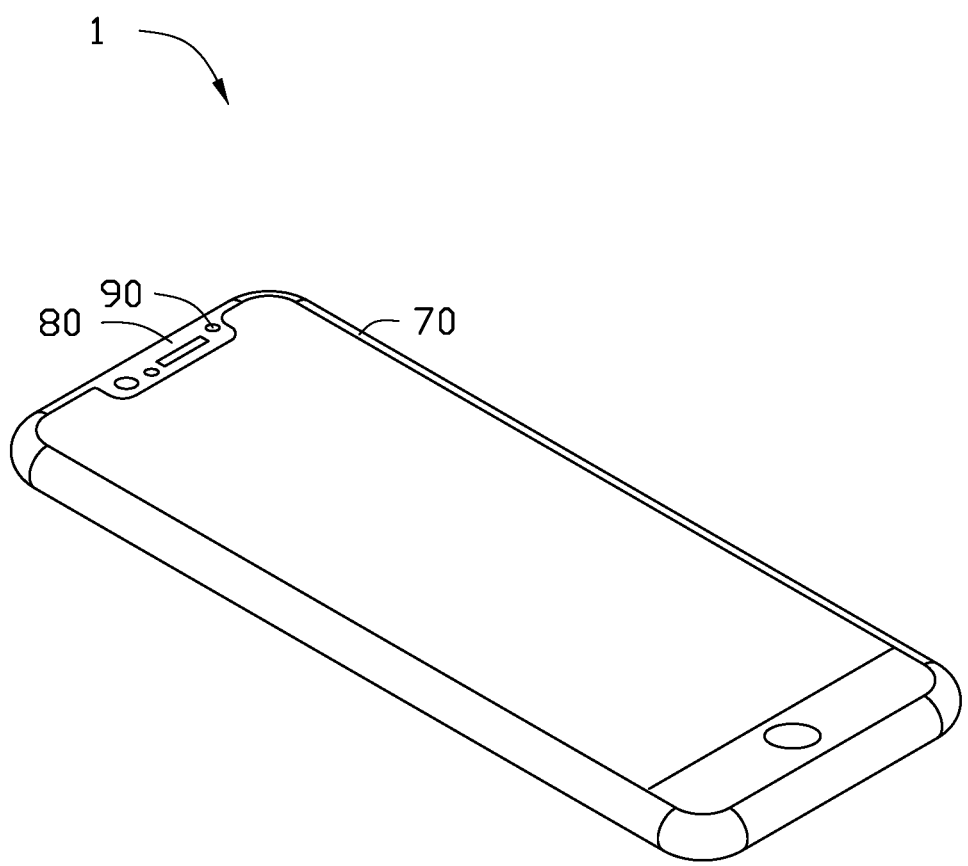
FIG. 4 is a schematic diagram of an electronic device including the structured light emitter module.

FIG. 4 shows an electronic device 1 including a main body 70 and a 3D structured light sensor 80 disposed in the main body 70. The 3D structured light sensor 80 can collect the facial biometrics of a person. The 3D structured light sensor 80 includes a structured light emitting module 90, a structured light receiving module, and an information processing unit. The structured light receiving module can be depth camera. The structured light emitting module 90 emits light in a speckle pattern. The structured light receiving module collects the light reflected from the outgoing patterned light and converts the same into the electrical signal and transmits the electrical signal to the information processing unit. The information processing unit processes the electrical signal and obtains information of the facial biometrics. The structured light emitting module 90 can be any structured light emitting module described in the above embodiment. The electronic device 1 is used as a mobile phone. In other embodiments, the electronic device 1 may also be a personal computer, a tablet computer, a smart home appliance, or the like.

The embodiments shown and described above are only examples. Even though numerous characteristics and advantages of the present technology have been set forth in the foregoing description, together with details of the structured and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A structured light emitting device comprising:
a laser source adapted for emitting laser;
an optical lens;
an optical diffraction element, wherein the optical lens and the optical diffraction element are sequentially located above the laser source, the optical lens and the optical diffraction element cooperate with each other to convert the laser into a speckle pattern; and
a driver, wherein the driver defines an accommodating portion, the accommodating portion passes through the driver, and the optical lens is disposed in the accommodating portion, when a complete speckle pattern cannot be obtained, the driver drives the optical lens to move to adjust an illumination range of the speckle pattern;
a carrier, wherein the laser source is received in the carrier, and the driver is fixed to the carrier; the carrier comprises a carrier surface and a plurality of sidewalls extending perpendicularly around a periphery of the carrier surface, the height of the sidewalls is greater than the thickness of the laser source, the driver is mounted on the carrier surface, the carrier surface defines a through hole, the through hole is aligned with the accommodating portion;
a circuit board, comprises a first rigid board, a second rigid board, and a flexible board, the flexible board is coupled between the first rigid board and the second rigid board, the sidewalls of the carrier is disposed at one side of the second rigid board, the laser source is disposed in a central area of the second rigid board, the second rigid board comprises a control chip, the control chip is disposed at a periphery of the central area for processing electrical signals, and the control chip is electrically connected to the circuit board, the circuit board further comprises a motherboard connector, the motherboard connector is disposed at a side of the first rigid board.

2. The structured light emitting device of claim 1, wherein the driver drives the optical lens to move in the accommodating portion along a direction away from the circuit board, the portion of the optical lens outside the accommodating portion is disposed adjacent to the optical diffraction element, the optical diffraction element covers the driver and the optical lens.

3. The structured light emitting device of claim 1, wherein the driver is a thermal driver, and the driver comprises shape memory alloy; the housing of the driver comprises at least two metal regions, each metal region contains at least one metal component, the metal component of the metal region on the side close to the accommodating portion is different from the metal component of the metal region on the side far from the accommodating portion, different metal components have different coefficients of thermal expansion.

4. The structured light emitting device of claim 1, wherein the driver is a piezoelectric driver, and the driver comprises at least two layers of piezoelectric material, a housing of the driver comprises at least two piezoelectric regions, each of the piezoelectric regions comprises at least one piezoelectric component, the piezoelectric component of the piezoelectric region on a side close to the accommodating portion is different from the component of the piezoelectric region on a side away from the accommodating portion, the piezoelectric material of different piezoelectric regions can be deformed in different directions by applying different electric charges to the driver.

5. The structured light emitting device of claim 1, wherein the driver is a micro electric motor driver.

6. A 3 dimensional (3D) structured light sensor comprising:
   a structured light emitting device comprising:
     a laser source adapted for emitting laser;
     an optical lens;
     an optical diffraction element, wherein the optical lens and the optical diffraction element are sequentially located above the laser source, the optical lens and the optical diffraction element cooperate with each other to convert the laser into a speckle pattern; and
     a driver, wherein the driver defines an accommodating portion, the accommodating portion passes through the driver, and the optical lens is disposed in the accommodating portion, when a complete speckle pattern cannot be obtained, the driver drives the optical lens to move to adjust an illumination range of the speckle pattern;
   a carrier, wherein the laser source is received in the carrier, and the driver is fixed to the carrier; the carrier comprises a carrier surface and a plurality of sidewalls extending perpendicularly around a periphery of the carrier surface, the height of the sidewalls is greater than the thickness of the laser source, the driver is mounted on the carrier surface, the carrier surface defines a through hole, the through hole is aligned with the accommodating portion;
   a circuit board, comprises a first rigid board, a second rigid board, and a flexible board, the flexible board is coupled between the first rigid board and the second rigid board, the sidewalls of the carrier is disposed at one side of the second rigid board, the laser source is disposed in a central area of the second rigid board, the second rigid board comprises a control chip, the control chip is disposed at a periphery of the central area for processing electrical signals, and the control chip is electrically connected to the circuit board, the circuit board further comprises a motherboard connector, the motherboard connector is disposed at a side of the first rigid board.

7. The 3D structured light sensor of claim 6, wherein the driver drives the optical lens to move in the accommodating portion along a direction away from the circuit board, the portion of the optical lens outside the accommodating portion is disposed adjacent to the optical diffraction element, the optical diffraction element covers the driver and the optical lens.

8. The 3D structured light sensor of claim 6, wherein the driver is a thermal driver, and the driver comprises shape memory alloy; the housing of the driver comprises at least two metal regions, each metal region contains at least one metal component, the metal component of the metal region on the side close to the accommodating portion is different from the metal component of the metal region on the side far from the accommodating portion, different metal components have different coefficients of thermal expansion.

9. The 3D structured light sensor of claim 6, wherein the driver is a piezoelectric driver, and the driver comprises at least two layers of piezoelectric material; a housing of the driver comprises at least two piezoelectric regions, each of the piezoelectric regions comprises at least one piezoelectric component, the piezoelectric component of the piezoelectric region on a side close to the accommodating portion is different from the component of the piezoelectric region on a side away from the accommodating portion, the piezoelectric material of different piezoelectric regions can be deformed in different directions by applying different electric charges to the driver.

10. The 3D structured light sensor of claim 6, wherein the driver is a micro electric motor driver.

11. An electronic device comprising:
   a 3D structured light sensor comprising:
     a structured light emitting device comprising:
        a laser source adapted for emitting laser;
        an optical lens;
        an optical diffraction element, wherein the optical lens and the optical diffraction element are sequentially located above the laser source, the optical lens and the optical diffraction element cooperate with each other to convert the laser into a speckle pattern; and
        a driver, wherein the driver defines an accommodating portion, the accommodating portion passes through the driver, and the optical lens is disposed in the accommodating portion, when a complete speckle pattern cannot be obtained, the driver drives the optical lens to move to adjust an illumination range of the speckle pattern;
     a carrier, wherein the laser source is received in the carrier, and the driver is fixed to the carrier; the carrier comprises a carrier surface and a plurality of sidewalls extending perpendicularly around a periphery of the carrier surface, the height of the sidewalls is greater than the thickness of the laser source, the driver is mounted on the carrier surface, the carrier surface defines a through hole, the through hole is aligned with the accommodating portion;
     a circuit board, comprises a first rigid board, a second rigid board, and a flexible board, the flexible board is coupled between the first rigid board and the second rigid board, the sidewalls of the carrier is disposed at one side of the second rigid board, the laser source is disposed in a central area of the second rigid board, the second rigid board comprises a control chip, the control chip is disposed at a periphery of the central area for processing electrical signals, and the control chip is electrically connected to the circuit board, the circuit board further comprises a motherboard connector, the motherboard connector is disposed at a side of the first rigid board.

12. The electronic device of claim 11, wherein the driver drives the optical lens to move in the accommodating portion along a direction away from the circuit board, the portion of the optical lens outside the accommodating portion is disposed adjacent to the optical diffraction element, the optical diffraction element covers the driver and the optical lens.

13. The electronic device of claim 11, wherein the driver is a thermal driver, and the driver comprises shape memory alloy.

14. The electronic device of claim 11, wherein the driver is a piezoelectric driver, and the driver comprises at least two layers of piezoelectric material.

* * * * *